United States Patent
Kennedy

(10) Patent No.: US 10,280,379 B2
(45) Date of Patent: *May 7, 2019

(54) DAIRY MANURE WASTE FIBER TO ENERGY PROCESS

(71) Applicant: QUALITY FLOW, INC., Northbrook, IL (US)

(72) Inventor: Peter M. Kennedy, Gurnee, IL (US)

(73) Assignee: QUALITY FLOW, INC., Northbrook, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/003,340

(22) Filed: Jun. 8, 2018

(65) Prior Publication Data

US 2018/0291297 A1  Oct. 11, 2018

Related U.S. Application Data

(62) Division of application No. 15/650,498, filed on Jul. 14, 2017, now Pat. No. 10,011,798, which is a
(Continued)

(51) Int. Cl.
| | | |
|---|---|---|
| *C10L 5/42* | (2006.01) | |
| *C10L 9/08* | (2006.01) | |
| *C10L 5/36* | (2006.01) | |

(52) U.S. Cl.
CPC .................. *C10L 5/42* (2013.01); *C10L 9/083* (2013.01); *C10L 5/361* (2013.01); *Y02E 50/10* (2013.01); *Y02E 50/15* (2013.01); *Y02E 50/30* (2013.01)

(58) Field of Classification Search
CPC . C10L 5/42; C10L 9/083; C10L 5/361; Y02E 50/30; Y02E 50/15; Y02E 50/10
See application file for complete search history.

(56) References Cited

U.S. PATENT DOCUMENTS

| | | |
|---|---|---|
| 4,624,417 A | 11/1986 | Gangi |
| 6,044,980 A | 4/2000 | Houle |

(Continued)

FOREIGN PATENT DOCUMENTS

| | | |
|---|---|---|
| GB | 920377 | 3/1963 |
| WO | 2012/126096 | 9/2012 |
| WO | 2013036694 | 3/2013 |

OTHER PUBLICATIONS

International PCT Search Report from International Application No. PCT/US2014/065934, dated Mar. 3, 2015, 2 pages.
(Continued)

*Primary Examiner* — Pamela H Weiss
(74) *Attorney, Agent, or Firm* — Greer, Burns & Crain, Ltd.

(57) ABSTRACT

A process for converting waste fibers to solid fuel is provided, including providing a supply of animal waste including the waste fibers in a predetermined quantity; washing the supply of animal waste for a predetermined washing period; dewatering the supply of animal waste by separating water from the waste fibers for a predetermined dewatering period; shedding the waste fibers for separating liquids from solids; compressing the dewatered and shed waste fibers to generate a plurality of briquettes; torrefying at least one of the plurality of briquettes in a torrefaction reactor using a heat source at a predetermined torrefying temperature for a predetermined torrefying period; removing the at least one of the plurality of briquettes from the reactor; and cooling the torrefaction reactor to reach a predetermined cooling temperature.

15 Claims, 1 Drawing Sheet

Related U.S. Application Data division of application No. 14/195,313, filed on Mar. 3, 2014, now Pat. No. 9,752,089.

(60) Provisional application No. 61/773,899, filed on Mar. 7, 2013.

(56) References Cited

U.S. PATENT DOCUMENTS

| | | | |
|---|---|---|---|
| 6,299,774 B1 | 10/2001 | Ainsworth et al. | |
| 8,317,037 B2 | 11/2012 | Fetrow | |
| 8,388,813 B1 | 3/2013 | Livingston et al. | |
| 9,752,089 B2 * | 9/2017 | Kennedy | C10L 9/083 |
| 10,011,798 B2 * | 7/2018 | Kennedy | C10L 9/083 |
| 2011/0089271 A1 | 4/2011 | Werner | |
| 2011/0179701 A1 | 7/2011 | Grassi | |
| 2011/0219679 A1 | 9/2011 | Budarin et al. | |
| 2011/0258914 A1 | 10/2011 | Banasiak et al. | |
| 2013/0055631 A1 | 3/2013 | Camper et al. | |
| 2013/0295628 A1 | 11/2013 | Retsina et al. | |
| 2014/0069798 A1 | 3/2014 | Hayward et al. | |

OTHER PUBLICATIONS

CAST-International Center for Appropriate and Sustainable Technology, Cow Power: A Guide to Harnessing the Energy in Livestock Waste, Colorado, USA (2009), 11 pages.

Gooch et al., Sand for Bedding Dairy Cow Stalls, Biological and Environmental Engineering Department of Cornell University, (2002), pp. 1-11.

* cited by examiner

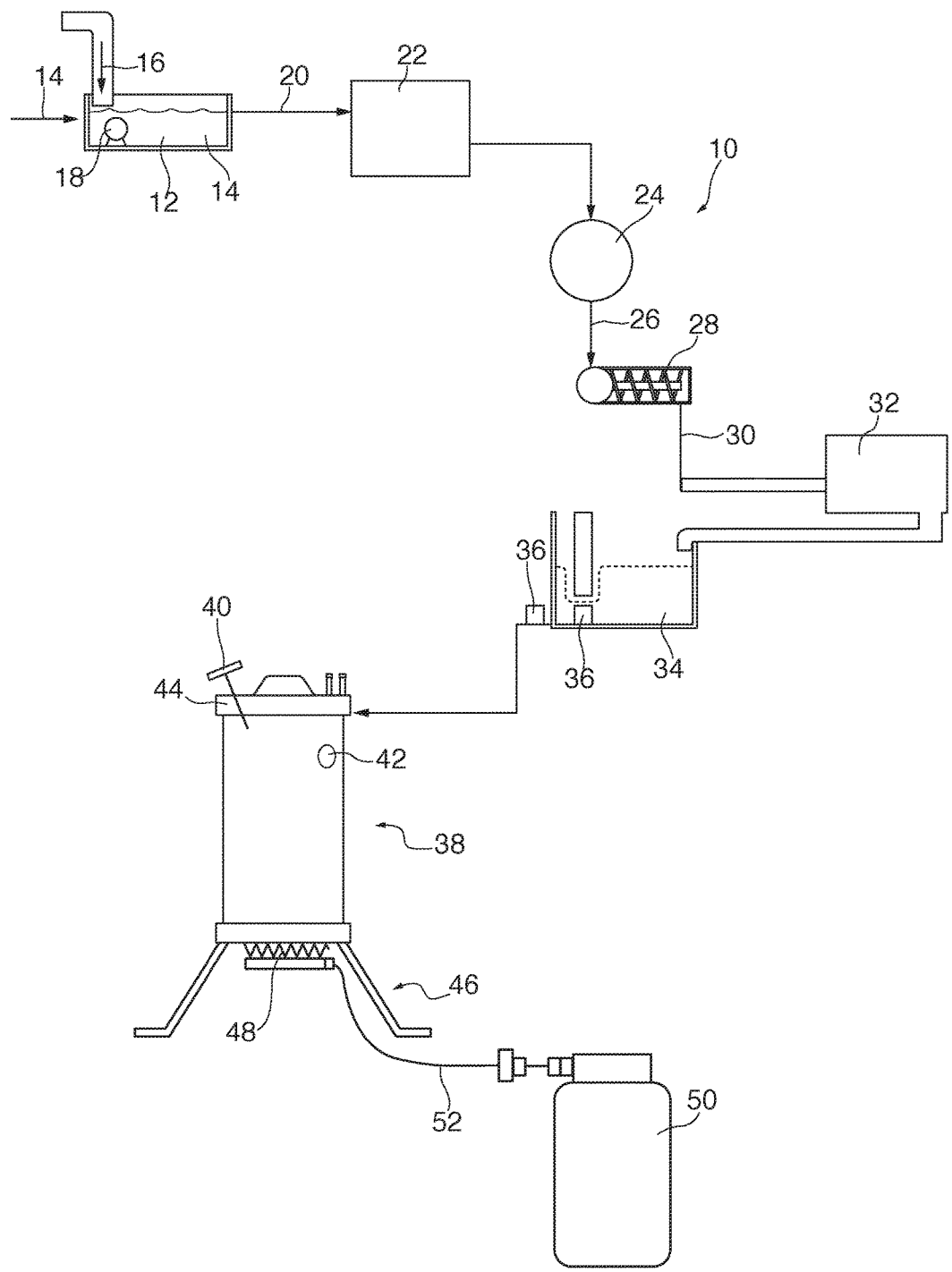

DAIRY MANURE WASTE FIBER TO ENERGY PROCESS

CROSS-REFERENCE TO RELATED APPLICATIONS

The present application is a divisional of U.S. application Ser. No. 15/650,498, filed on Jul. 14, 2017, which is a divisional of U.S. application Ser. No. 14/195,313, filed on Mar. 3, 2014, which claims priority to a U.S. provisional patent application Ser. No. 61/773,899 filed on Mar. 7, 2013 under 35 U.S.C. § 119(e), all of which are incorporated herein by reference.

FIELD OF THE INVENTION

The present invention is broadly concerned with fuel products formed from dairy livestock waste and processes for making and using the fuel products. More particularly, the products are formed by cleaning, dewatering, compressing and torrefying dairy livestock waste or manure fiber into solid fuel derived directly from dairy cow waste.

BACKGROUND

There is a tremendous amount of dairy manure waste generated by dairy farms each year that must be managed. However, there are limited options for disposing of this material, specifically manure coming from dairy Concentrated Animal Feeding Operations (CAFO's). Due to the high density of cows in such facilities, an extremely large quantity of manure is produced daily in these facilities, resulting in often strong smells and continual odors that are objectionable to many people living near the facilities. Currently, the waste is usually stored in lagoons due to the relatively high percentage of water in the waste. However, lagoons and other current methods do not eliminate odor problems from dairy farming operations. Additionally, current disposal/storage methods, along with land farming, in many cases, run the risk of contaminating the air, land, and water in and around these CAFO's.

At the same time, in the global economy, increasing quantities of fossil fuels are utilized each year for electricity production, heating, steam generation, transportation and other needs. There are continual efforts by various environmentally-minded groups to encourage the decreased consumption of fossil fuels to preserve the limited quantity of the fuels as well as to decrease the quantity of pollutants produced by burning fossil fuels. While these efforts have had some success, there is always the need for additional processes and products which utilize energy sources other than fossil fuels.

There is a need for products and processes which can utilize dairy wastes for producing energy such as heat and power.

SUMMARY

The above-listed need is met by the present process, which features the use of dairy cow waste manure fiber to form a fuel product. In the present process, the manure fiber is washed, dewatered, and compressed, and then undergoes thermal torrefaction. Optionally, the present processed waste material can be recompressed to yield high quantities of energy without emitting large quantities of pollutants. Torrefaction is defined as a thermochemical decomposition of biomass at an elevated temperature, without the presence of oxygen. The dewatering, compression, and torrefaction steps produce a solid fuel product, which is easier to transport and store than waste manure fiber biomass. In some cases, the processed waste material is ground or pulverized for easier handling and/or transport.

More specifically, the present invention provides a process for converting dairy manure waste fibers to solid fuel. The present process includes providing a supply of animal waste, dewatering the waste, which includes waste fibers, compressing the dewatered waste to form briquettes, and torrefying the briquettes. Prior to the dewatering step, the process further includes washing the dairy manure waste, including the waste fibers. During the torrefying step, the process further includes adding cellulous particles to the compressed waste to absorb by-product oils and tar from the fibers. Example cellulous particles include sawdust, absorbent rice hulls, and peanut shells. The torrefying step takes place at a temperature up to 700 degrees Fahrenheit, and lasts up to thirty minutes. The compressed briquettes are approximately 3.5" by 2.5" by 6.0".

After the torrefying step, the process further includes cooling the briquettes to below 100 degrees Fahrenheit. The present process further includes recompressing the torrefyed briquettes after the torrefying step. The present process further includes pulverizing the torrefyed briquettes after the torrefying step.

BRIEF DESCRIPTION OF THE DRAWING

FIG. 1 is a schematic flow chart depicting the present process.

DETAILED DESCRIPTION

Referring to FIG. 1, the present dairy manure waste fiber to energy process system is generally designated 10, and is designed for converting dairy manure waste fibers to solid fuel. An agitation trough or pit 12 is supplied with a predetermined quantity of fiber 14, such as cow manure waste, including waste fibers. The fibers are the undigested elements of the cow's diet. The waste fibers 14 are preferably and optionally washed with a supply of clean recycled water 16 to remove as much elemental contamination from the dairy manure fiber to reduce interference from side effects which may occur upon combustion. The principal elemental contaminant is potassium. It is excreted in the cows' urine and is mixed with cow manure. The side effects of too much potassium include that it has a low elemental melting point and can cause problems in furnace and boiler operations when it is present in high levels upon the combustion of solid fuel. Some fossil coals also have this problem. Washing, in simple terms, cleans the urine, as well as dirt and soil from the fiber. A water recirculation pump 18 is preferably provided in or associated with the trough 12 for providing agitation. Any properly sized, commercially available pump is considered suitable. In a preferred embodiment, the fiber washing step will take 5-10 minutes, depending on the amount of elemental surface contamination on the fiber.

The fibers 14 are next dewatered by being pumped through piping 20 sufficient to carry the weight and amounts of the fiber into a dewatering device 22 adequate to handle the weight and volume of manure fiber on a continuous basis to separate the water from the fiber. In a preferred embodiment, the dewatering device 22 is a centrifuge and this step can take 5 to 10 minutes, depending on the density of the fiber in the piping 20. It is also contemplated that other suitable dewatering devices are employed at this point in the process, including but not limited to dewatering screens, presses and the like. Preferably, the dewatering device is operated at a velocity that will reduce the fibers 14 to approximately 70% moisture by weight.

The dewatering device 22 is then slowed to allow the fiber 14 to be shed from the centrifuge by means of a manure drum roller system 24. A drum roller is a piece of agricultural equipment used in the liquid-solids separation process. It allows for the manure to roll, at less velocity than a centrifuge, so that it stays loose and does not compact so as to make it easier to handle as it moves on to a screw press device as a near end stage of water removal. The manure drum roller system 24 is used to continue removing water from the fiber, and allows air contact with the fiber where it can "cake." The fiber 14 is released from the roller system 24 for the purpose of entering piping 26 sufficient to carry the weight and volume of fiber to be received by a dairy manure fiber screw press 28.

The screw press 28 should be sufficient to handle the volume and weight of the fiber, is operated continuously, and is preferably automated. After passing through the press 28, the fiber 14 will then be approximately 60-65% moisture content by weight in a preferred embodiment. The fiber 14 is moved by the screw press 28 via a conveyor 30 to a dry storage area 32, where it can be collected in any amounts necessary to prepare it for further drying via commercially available rotary or drum drying. Those familiar with the art are aware of these further drying devices. These further drying procedures, in a preferred embodiment, will reduce the fiber moisture content to 10 to 12% (or lower). Those familiar with the art should also understand the operational use of these devices as they are commercially available from various manufacturers.

The fiber 14 is then compressed with a cold briquetting device 34. In a preferred embodiment, the cold briquetting device 34 compresses the fiber at up to 50 English tons of force or greater. Those individuals familiar with the art should know that one can substitute any equivalent briquetting device for equivalent size and strength compression. In the preferred embodiment, the briquettes 36 formed by the cold briquetting device 34 are 3.5" by 2.5" by 6.0" (height by width by length). Other sizes are contemplated depending on the application. Forming the briquettes 36 with the cold briquetting device 34 allows for ease of movement and handling of the fiber 14 to move it to a torrefaction reactor, generally designated 38.

Before placing the briquettes 36 in the reactor 38, cellulous particles are preferably first sprinkled at the bottom of the reactor 38 to absorb by-product oils and tar from the fiber torrefaction step. In a preferred embodiment, clean sawdust works well, but absorbent rice hulls or peanut shells can also be used in place of the clean sawdust lining the bottom of the reactor 38.

In a preferred embodiment, the reactor 38 is preheated to 350 degrees Fahrenheit to help speed the torrefaction process. The reactor 38, depending on how it is heated, should have an internal thermometer 40 for measuring the internal temperature, as well as an external thermometer 42. In the present process, in certain embodiments two different heat sources were used on two different reactors. In one embodiment, a wood fired source of heat was used on a double walled reactor. The external thermometer 42 is employed to gauge fired temperature around the reactor. On the alternative propane heated model, the external thermometer 42 is retained due to the speed at reaching temperatures first in the lower part of the reactor. Both reactor types have the internal thermometer 40 installed on a sealed lid 44 of the reactor 38. A vacuum seal (not shown) is used via a vacuum pump (not shown) to prevent combustion of the reactor 38 while the fiber briquettes 36 are in the reactor. The sealed lid 44 at an opening of the reactor 38 is necessary for reducing the entry of outside oxygen into the reactor 38. It is contemplated that the seal is pressurized, but optionally may be non-pressurized.

The external heat source, generally designated 46, is configured for generating heat applied to the reactor 38 for the torrefaction step, and can be from any commercially available apparatus, such as a propane gas burner 48. The reactor 38 is preferably disposed above the gas burner 48, which is supplied with fuel by a propane tank 50 by a propane feed line 52. Other heating sources may be used in place of propane, such as wood, coal, or charcoal.

The torrefaction or torrefying step within the reactor 38, in a preferred embodiment, lasts up to 30 minutes depending on the amount of fiber briquettes 36 in the reactor 38. Also in a preferred embodiment, the torrefaction is carried out in the approximate range of 600 to 700 degrees Fahrenheit. The torrefaction step is complete when an evidence of gaseous discharge (via internal vapor pressures) or bio-oil residue is observed around the reactor lid 44.

Next, the reactor 38 is removed from the external heat source 46, and allowed to cool down. While the reactor 38 is cooling down, the lid 44 should remain closed to prevent the exposure of the briquettes 36 to fresh oxygen through the ambient air. In a preferred embodiment, the internal temperature of the reactor should cool to below 100 degrees Fahrenheit (below 80 degrees Fahrenheit is preferred) before opening the reactor 38. Prior to removal from the reactor 38, the briquettes 36 should appear well formed and darkened due to the torrefaction process.

After the briquettes 36 are removed from the reactor 38, the briquettes can be recompressed to prepare them for water solubility/hydroscopic testing effects. This recompression step would be necessary for open container shipping, as is the case for rail shipping for fossil coal. The briquettes 36 are also optionally comminuted, ground or pulverized for packaging and shipping. Those familiar in the art of this process should know that it is possible to compress sooner in the overall process dependent on the feedstock used, residence time in the reactor 38, and packaging and shipping chosen.

While a particular embodiment of the process has been described herein, it will be appreciated by those skilled in the art that changes and modifications may be made thereto without departing from the invention in its broader aspects and as set forth in the following claims.

The invention claimed is:

1. A system for converting waste fibers to solid fuel, the system comprising:
    a centrifuge configured to receive a mixture of animal waste and water and provide dewatered fibers;
    a drum roller configured to receive the dewatered fibers from the centrifuge and to provide shredded fibers;
    a screw press connected downstream of the drum roller, and configured to receive the shredded fibers and to provide a reduced water content shredded fibers;
    a briquetting device downstream of the screw press, and configured to provide at least one compressed fiber briquette; and
    a torrefaction reactor configured to receive the at least one compressed fiber briquette and provide at least one solid fuel briquette; and wherein the torrefaction reactor comprises an external heat source configured to heat the at least one compressed fiber briquette indirectly.

2. The system of claim 1, further comprising:
a dry storage area between the screw press and the briquetting device; and
a conveyer disposed upstream of the dry storage area and configured to receive reduced water content shredded fibers.

3. The system of claim 2, wherein the dry storage area comprises a dryer.

4. The system of claim 1, further comprising:
a pump configured to provide the mixture of animal waste and water, via piping, to the centrifuge.

5. A process for converting waste fibers to solid fuel, said process comprising:
providing a supply of animal waste including the waste fibers;
washing the supply of animal waste for a washing period sufficient to remove at least one of urine, dirt, and soil from the animal waste to provide a washed animal waste;
removing water from said washed animal waste to provide waste fiber comprising less than 70% water, by weight;
shredding said waste fibers;
compressing the waste fibers after said shredding to generate a plurality of briquettes;
torrefying at least one of the plurality of briquettes in a torrefaction reactor using a heat source which is an external heat source in the absence of oxygen at a temperature for a time period sufficient to provide a torrefied briquette, wherein said temperature of said torrefying step ranges between 600 and 700 degrees Fahrenheit; and,
recovering the torrefied briquette from the reactor.

6. The process of claim 5, further comprising:
cooling the torrefaction reactor to a temperature below the temperature during said torrefying step.

7. The process of claim 6, wherein said temperature of said cooling step is below 100 degrees Fahrenheit.

8. The process of claim 5, wherein said providing step is performed first, said washing step is performed after said providing step, said dewatering step is performed after said washing step, said compressing step is performed after said dewatering step, and said torrefying step is performed after said compressing step.

9. The process of claim 5, wherein said time period of said torrefying step lasts up to thirty minutes.

10. The process of claim 5, wherein a dimension of the briquettes from the plurality of briquettes is approximately 3.5" by 2.5" by 6.0".

11. The process of claim 5, further comprising:
compressing the torrefied briquette after said torrefying step.

12. The process of claim 5, further comprising:
pulverizing the torrefied briquette after said torrefying step.

13. The process of claim 5, further comprising:
removing oxygen from the torrefaction reactor prior to torrefying at least one of the plurality of briquettes in the torrefaction reactor.

14. The process of claim 5, further comprising:
preheating the torrefaction reactor to 350 degrees Fahrenheit before torrefying at least one of the plurality of briquettes in the torrefaction reactor.

15. The process of claim 5, wherein the torrefaction reactor includes a lid, and wherein the process includes:
sealing the lid to the torrefaction reactor before torrefying at least one of the plurality of briquettes in the torrefaction reactor.

* * * * *